(12) United States Patent
Matsumura et al.

(10) Patent No.: US 11,973,197 B2
(45) Date of Patent: Apr. 30, 2024

(54) LEAD WIRE FOR NONAQUEOUS ELECTROLYTE BATTERY, INSULATING FILM AND NONAQUEOUS ELECTROLYTE BATTERY

(71) Applicant: SUMITOMO ELECTRIC INDUSTRIES, LTD., Osaka (JP)

(72) Inventors: Yutaka Matsumura, Osaka (JP); Kengo Goto, Osaka (JP); Akira Tsuchiko, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/913,319

(22) PCT Filed: Dec. 27, 2021

(86) PCT No.: PCT/JP2021/048711
§ 371 (c)(1),
(2) Date: Sep. 21, 2022

(87) PCT Pub. No.: WO2023/127066
PCT Pub. Date: Jul. 6, 2023

(65) Prior Publication Data
US 2023/0207891 A1     Jun. 29, 2023

(51) Int. Cl.
*H01M 10/42*     (2006.01)
*H01M 10/653*    (2014.01)
(Continued)

(52) U.S. Cl.
CPC ..... *H01M 10/4235* (2013.01); *H01M 10/653* (2015.04); *H01M 50/124* (2021.01); *H01M 50/553* (2021.01)

(58) Field of Classification Search
CPC ........... H01M 10/4235; H01M 10/653; H01M 50/124; H01M 50/553
See application file for complete search history.

(56) References Cited

U.S. PATENT DOCUMENTS 10,644,273 B2 * 5/2020 Takada .................... B32B 27/32
2008/0254360 A1   10/2008 Miyazawa et al.
(Continued)

FOREIGN PATENT DOCUMENTS

JP    2000-67846 A    3/2000
JP    2002-216715 A   8/2002
(Continued)

OTHER PUBLICATIONS

"Catalog(s) of Product Data Sheet for Film, Product Data Sheet for Injection (1), Product Data Sheet for Injection (2), Product Data Sheet for QUALEAR, and Product Data Sheet for Extrusion". SunAllomer Ltd., Oct. 30, 2019.
(Continued)

*Primary Examiner* — Milton I Cano
*Assistant Examiner* — Mary G Henshaw
(74) *Attorney, Agent, or Firm* — Oliff PLC

(57) ABSTRACT

A lead wire for a nonaqueous electrolyte battery has a conductor, and an insulating film having a plurality of layers and covering at least a part of the outer peripheral surface of the conductor, wherein the insulating film has a conductor-covering layer laminated on a surface of the conductor, a first insulating layer laminated on an outermost surface of the insulating film, and a second insulating layer laminated on an inner surface of the first insulating layer; the conductor-covering layer contains an acid-modified polyolefin; and the ratio (E1/E2) of an elastic modulus E1 of the first insulating layer at any one temperature in the range of 80° C. or more and 125° C. or less to an elastic modulus E2 of the second insulating layer at the same temperature as in the first insulating layer, is 0.10 or more and 10.00 or less.

5 Claims, 3 Drawing Sheets

(51) Int. Cl.
  *H01M 50/124*   (2021.01)
  *H01M 50/553*   (2021.01)

(56) References Cited

U.S. PATENT DOCUMENTS

| | | | | |
|---|---|---|---|---|
| 2010/0221601 | A1* | 9/2010 | Fukuda | H01M 50/124 |
| | | | | 429/185 |
| 2012/0082888 | A1* | 4/2012 | Hashimoto | H01M 50/136 |
| | | | | 29/25.03 |
| 2013/0130007 | A1 | 5/2013 | Orihara et al. | |
| 2021/0234222 | A1 | 7/2021 | Hiraki et al. | |
| 2022/0416340 | A1* | 12/2022 | Kato | H01M 50/188 |

FOREIGN PATENT DOCUMENTS

| | | | | |
|---|---|---|---|---|
| JP | 2006-128096 | A | | 5/2006 |
| JP | 2012-46019 | A | | 3/2012 |
| JP | 2012-104503 | A | | 5/2012 |
| JP | 2013-222545 | A | | 10/2013 |
| JP | 2014-026980 | A | | 2/2014 |
| JP | 2014225378 | A | * | 12/2014 |
| JP | 2015-232945 | A | | 12/2015 |
| JP | 2016-91939 | A | | 5/2016 |
| JP | 2017-73200 | A | | 4/2017 |
| JP | 2018014272 | A | * | 1/2018 ............. H01G 11/74 |
| JP | 2020-161484 | A | | 10/2020 |
| JP | 2021-073655 | A | | 5/2021 |
| JP | 7120502 | B1 | | 8/2022 |
| KR | 2016060526 | A | * | 5/2016 ............. H01M 2/08 |
| WO | 2021/090950 | A1 | | 5/2021 |
| WO | 2021/246177 | A1 | | 12/2021 |

OTHER PUBLICATIONS

"NOVATEC™ PP Injection Molding Grade". Japan Polypropylene Corporation, Jan. 1, 2023.
"Prime Polypro (Injection: High Impact Strength)(Blow, Extrusion molding)(Film)(Fiber)(Injection: Stiffness, Clarity) Product Data Sheet." Prime Polymer Co., Ltd. Jan. 2023, Jul. 2022, Jan. 2023, Jul. 2022, and Jul. 2022.
"WELNEX™ Physical Property Table". Japan Polypropylene Corporation, Sep. 1, 2020.
Ohnaga, Takashi and Yokoyama, Yoshiyuki. "High-Performance Polypropylene Alloys Obtained with Structure Control on a Nanoscale". pp. II-20-II-21, 2004.
Okubo, Nobuaki. "Application Brief". Hitachi High-Tech, DMA No. 30, pp. 1-3, 1995.
Mar. 13, 2023 Office Action issued in U.S. Appl. No. 17/913,355.
U.S. Appl. No. 17/913,355, filed Sep. 21, 2022 in the name of Matsumura et al.
Aug. 22, 2023 Office Action issued In U.S. Appl. No. 17/913,355.

* cited by examiner

LEAD WIRE FOR NONAQUEOUS ELECTROLYTE BATTERY, INSULATING FILM AND NONAQUEOUS ELECTROLYTE BATTERY

TECHNICAL FIELD

The present disclosure relates to a lead wire for a nonaqueous electrolyte battery, an insulating film, and a nonaqueous electrolyte battery.

BACKGROUND ART

Along with size reduction and weight reduction of electronic devices, size reduction and weight reduction of electric parts such as batteries and capacitors to be used for these devices have been also demanded. Hence, a nonaqueous electrolyte battery using a bag body as an enclosing container and having a nonaqueous electrolyte (electrolytic solution), a positive electrode and a negative electrode enclosed inside the bag body is adopted, for example. As the nonaqueous electrolyte, an electrolytic solution in which a lithium salt containing fluorine, such as $LiPF_6$ or $LiBF_4$, is dissolved in propylene carbonate, ethylene carbonate, dimethyl carbonate, diethyl carbonate, ethyl methyl carbonate or the like is used.

For the enclosing container, a property of preventing penetration of an electrolytic solution and gas and infiltration of moisture from the outside is required. Hence, a laminate film in which a metal layer such as an aluminum foil is covered with a resin is used as a material for the enclosing container, and the enclosing container is formed by thermally fusing ends of two sheets of the laminate film.

One end of the enclosing container is an opening, and a nonaqueous electrolyte, a positive electrode plate, a negative electrode plate, a separator and the like are enclosed inside the enclosing container. Lead conductors having one ends connected to the positive electrode plate and the negative electrode plate are arranged so as to extend from the inside of the enclosing container to the outside, and finally by heat sealing (thermally fusing) the opening of the enclosing container to close the opening and adhere the enclosing container and the lead conductors to seal the opening. This portion to be finally thermally fused is called a seal portion.

On each portion of the lead conductors corresponding to the seal portion, an insulating film is covered, and a thing having the insulating film and the lead conductor is called a lead wire (tab lead) for a nonaqueous electrolyte battery. The enclosing container and the lead conductors are adhered (thermally fused) through the insulating film. Therefore, the insulating film is required to have a characteristic of not generating short-circuit between a metal layer of the enclosing container and the lead conductor and being capable of retaining the adhesivity between the lead conductor and the enclosing container.

As such a tab lead, for example, proposed in a conventional technology is a lead wire for a nonaqueous electrolyte battery, the lead wire having an insulator on the outside of a composite film layer formed by applying a treating solution containing a resin component containing a polyacrylic acid and a polyacrylic acid amide, and a metal salt, on a lead conductor (see Patent Literature 1).

CITATION LIST

Patent Literature

PTL 1: Japanese Patent Laying-Open No. 2006-128096

SUMMARY OF INVENTION

The lead wire for a nonaqueous electrolyte battery of the present disclosure comprises a conductor, and an insulating film having a plurality of layers and covering at least a part of the outer peripheral surface of the conductor, wherein the insulating film has a conductor-covering layer laminated on a surface of the conductor, a first insulating layer laminated on an outermost surface of the insulating film, and a second insulating layer laminated on an inner surface of the first insulating layer; the conductor-covering layer comprises an acid-modified polyolefin; and the ratio (E1/E2) of an elastic modulus E1 of the first insulating layer at any one temperature in the range of 80° C. or more and 125° C. or less to an elastic modulus E2 of the second insulating layer at the same temperature as in the first insulating layer, is 0.10 or more and 10.00 or less.

DETAILED DESCRIPTION

Figure 1:
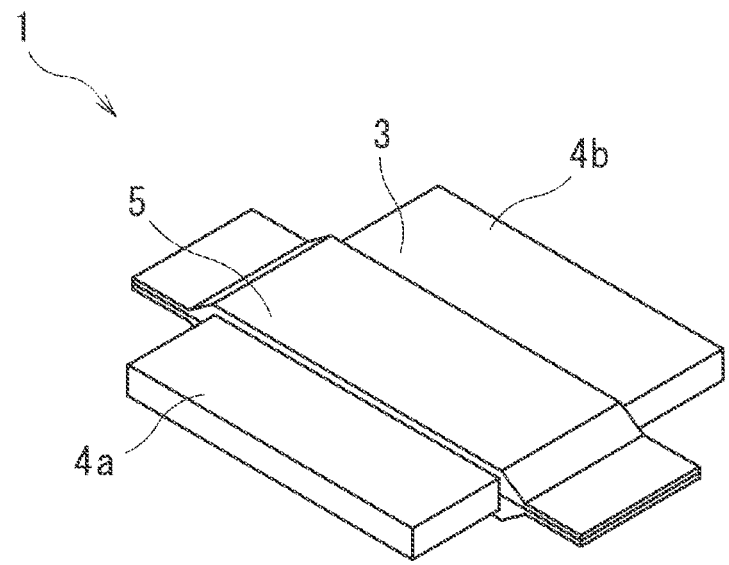
FIG. 1 is a perspective view of a lead wire for a nonaqueous electrolyte battery according to one embodiment of the present disclosure.

Problem to be Solved by the Present Disclosure

In recent years, for requests and challenges of shortening the charging time of electric vehicles and elongating the cruising distance thereof, on vehicular nonaqueous electrolyte batteries, the quick charging/discharging characteristic in which a large current is chargeable/dischargeable in a short time is demanded. Along with such quick charging/discharging of the nonaqueous electrolyte batteries, the use environment of the nonaqueous electrolyte batteries is a higher temperature environment. Hence, a higher heat resistance than conventional one is required for materials constituting the nonaqueous electrolyte batteries, and improvement of the adhesivity under high temperatures between lead wires and enclosing containers of the nonaqueous electrolyte batteries has been a challenge.

The present disclosure has an object to provide a lead wire for a nonaqueous electrolyte battery excellent in the adhesivity under high temperatures with an enclosing container of a nonaqueous electrolyte battery.

Advantageous Effect of the Present Disclosure

According to the present disclosure, a lead wire for a nonaqueous electrolyte battery excellent in the adhesivity under high temperatures with an enclosing container of a nonaqueous electrolyte battery can be provided.

Description of Embodiments

First, embodiments of the present disclosure will be listed and described.

A lead wire for a nonaqueous electrolyte battery of the present disclosure has a conductor, and an insulating film having a plurality of layers and covering at least a part of the outer peripheral surface of the conductor, wherein the insulating film has a conductor-covering layer laminated on a surface of the conductor, a first insulating layer laminated on an outermost surface of the insulating film, and a second insulating layer laminated on an inner surface of the first insulating layer; the conductor-covering layer contains an acid-modified polyolefin; and the ratio (E1/E2) of an elastic modulus E1 of the first insulating layer at any one temperature in the range of 80° C. or more and 125° C. or less to an elastic modulus E2 of the second insulating layer at the same temperature as in the first insulating layer, is 0.10 or more and 10.00 or less.

In the lead wire for a nonaqueous electrolyte battery, due to that the insulating film has a conductor-covering layer laminated on a surface of the conductor and the conductor-covering layer contains an acid-modified polyolefin, the adhesivity with the conductor is good. Further due to that the ratio (E1/E2) of an elastic modulus E1 of the first insulating layer at any one temperature in the range of 80° C. or more and 125° C. or less to an elastic modulus E2 of the second insulating layer at the same temperature as in the first insulating layer, is 0.10 or more and 10.00 or less, the elastic moduli in a temperature range a high-output battery reaches of the first insulating layer and the second insulating layer laminated on an inner surface of the first insulating layer fall within near ranges. The use upper limit temperature of nonaqueous electrolyte batteries is generally nearly 60° C., and in a peeling phenomenon caused when an electrolytic solution, an electrolyte and the like are deteriorated in a battery interior and turn to decomposed gases, which exert an internal pressure, material breakage, which becomes a starting point of peeling, of an insulating film and the like is caused, and the peeling then progresses from the starting point generated, leading to such a situation that the whole adhesion portion is peeled and the decomposed gases and the electrolytic solution leak out. In the lead wire for a nonaqueous electrolyte battery, however, even when a force is generated in the peeling direction on the insulating film under high temperatures equal to or higher than the conventional upper limit temperature, since the elastic moduli of the first insulating layer and the second insulating layer laminated on an inner surface of the first insulating layer are near, the two layers are simultaneously deformed by a peel force and the force is dispersed, whereby making the peeling start point can be suppressed. Hence, in the case where the lead wire for a nonaqueous electrolyte battery is accommodated in the enclosing container of the nonaqueous electrolyte battery, and adhered through the insulating film with the enclosing container, firm adhesion is easily retained even under high temperatures. Therefore, the lead wire for a nonaqueous electrolyte battery is excellent in the adhesivity under high temperatures with the enclosing container of the nonaqueous electrolyte battery.

The "elastic modulus" is measured by using a nano indentor. The measurement of the elastic modulus (nano indentation method) by the nano indentor is carried out by the following procedure. As the nano indentor, TriboIndenter TI980, manufactured by Hysitron, Inc. is used. In the nano indentor, a regular triangular pyramidal indenter (Berkovich indenter) whose tip is composed of a diamond tip is used. The adhesible film being a measurement sample is cut in the lamination direction and a cross section of the insulating film is exposed by Ar ion milling. Then, by using the nano indentor, the indenter is impressed in the direction perpendicular to the cross section of the insulating film under the following measurement condition to measure the load-displacement curve and the elastic modulus is calculated.

(1) Indenting time: 3 s
(2) Holding time: 0 s
(3) Unloading time: 0 s
(4) Loading rate: 8 mN/s
(5) Indenting load: 0.5 mN to 5 mN (suitably adjusted so the impression size as to become about 10 μm to 20 μm)
(6) Indentation depth arrival time: 5 s
(7) Load holding time: 0 s
(8) Indentation depth unloading time: 5 s It is preferable that the elastic modulus E2 is 10 MPa or more and 900 MPa or less, and the elastic modulus E1 is 10 MPa or more and 900 MPa or less. Due to that the elastic modulus E2 and the elastic modulus E1 are 10 MPa or more and 900 MPa or less, since the peel strength is improved, and uniformization of the strength of each layer constituting the insulating film can be attained and the stress concentration can be suppressed, the cracking and interlayer peeling of the insulating film making a joining portion with the enclosing container of the nonaqueous electrolyte battery can be further suppressed.

The ratio (E1/E2) of an elastic modulus E1 of the first insulating layer at any one temperature in the range of 80° C. or more and 125° C. or less to an elastic modulus E2 of the second insulating layer at the same temperature as in the first insulating layer, is preferably 0.25 or more and 4.00 or less. Due to that the ratio (E1/E2) of the elastic modulus E1 to the elastic modulus E2 is 0.25 or more and 4.00 or less, the adhesivity under high temperatures of the lead wire for a nonaqueous electrolyte battery with the enclosing container of the nonaqueous electrolyte battery can be further improved.

It is preferable that the elastic modulus E2 is 20 MPa or more and 500 MPa or less, and the elastic modulus E1 is 20 MPa or more and 500 MPa or less. Due to that the elastic modulus E2 and the elastic modulus E1 are together 20 MPa or more and 500 MPa or less, the effect of suppressing cracking and interlayer peeling of the insulating film making a joining portion with the enclosing container of the nonaqueous electrolyte battery can be further improved.

It is preferable that the average thickness T2 of the second insulating layer is 25 μm or more, and the average thickness T1 of the first insulating layer is 25 μm or more. Due to that the average thickness T2 of the second insulating layer is 25 μm or more and the average thickness T1 of the first insulating layer is 25 μm or more, the strengths of the second insulating layer and the first insulating layer can be made good.

The insulating film is used for the lead wire for a nonaqueous electrolyte battery of the present disclosure. The lead wire for a nonaqueous electrolyte battery is, due to using the insulating film, excellent in the adhesivity under high temperatures with the enclosing container of the nonaqueous electrolyte battery.

The nonaqueous electrolyte battery of the present disclosure comprises an enclosing container and a plurality of lead wires for a nonaqueous electrolyte battery arranged so as to extend from the inside of the enclosing container to the outside, and the enclosing container is constituted of a sheet body(s) having an innermost resin layer, a metal layer and an outermost resin layer laminated in this order, and the innermost resin layer and the first insulating layer are thermally fused.

The nonaqueous electrolyte battery, due to having the plurality of lead wires for a nonaqueous electrolyte battery and that the first insulating layers of the lead wires and the innermost resin layer of the enclosing container are thermally fused, is excellent in the adhesivity under high temperatures between the lead wires and the enclosing container.

In the nonaqueous electrolyte battery, it is preferable that the ratio (E4/E1), of an elastic modulus E4 of the innermost resin layer at any one temperature in the range of 80° C. or more and 125° C. or less to an elastic modulus E1 of the first insulating layer at the same temperature as in the innermost resin layer, is 0.10 or more and 10.00 or less. By making the ratio, at any one temperature in the range of 80° C. or more and 125° C. or less, of the elastic moduli of the first insulating layer and the innermost resin layer thermally fused to be 0.10 or more and 10.00 or less, the elastic moduli at any one temperature in the range of 80° C. or more and 125° C. or less of the first insulating layer and the innermost resin layer of the enclosing container thermally fused with the first insulating layer fall within near ranges. Hence, even if a force is generated in such a direction that the lead wire for a nonaqueous electrolyte battery and the enclosing container are peeled off each other under high temperatures, the stress concentration is less likely to be generated and the generation of cracking can be suppressed, and the adhesive force between the first insulating layer and the innermost resin layer can be improved. Therefore, the nonaqueous electrolyte battery is excellent in the adhesivity between the lead wire and the enclosing container under high temperatures.

The elastic modulus E4 is preferably 10 MPa or more and 900 MPa or less. Due to that the elastic modulus E4 at any one temperature in the range of 80° C. or more and 125° C. or less of innermost resin layer 27 is, similarly to the elastic modulus E1 at any one temperature in the range of 80° C. or more and 125° C. or less of the first insulating layer, 10 MPa or more and 900 MPa or less, even if a force is generated in such a direction that the lead wire and the enclosing container are peeled off each other under high temperatures, the stress concentration is further less likely to be generated and the effect of suppressing generation of interlayer peeling and cracking of the first insulating layer and the innermost resin layer can be further enhanced.

Detailed Description of Embodiments

Hereinafter, the lead wire for a nonaqueous electrolyte battery and the nonaqueous electrolyte battery according to the present disclosure will be described in detail.

<Lead Wire for a Nonaqueous Electrolyte Battery>

Figure 2:
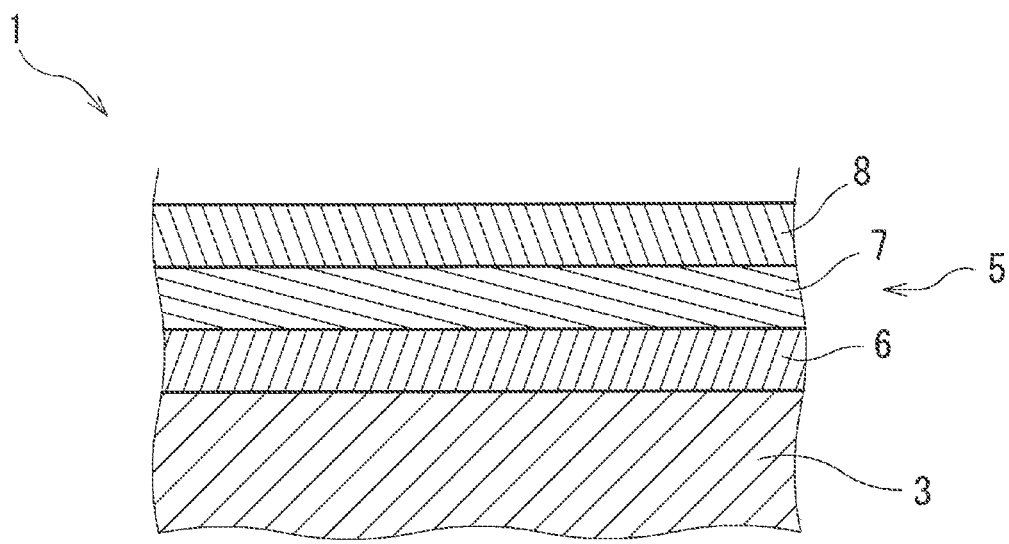
FIG. 2 is a partial cross-sectional view of a lead wire for a nonaqueous electrolyte battery according to one embodiment of the present disclosure.

FIG. 1 is a perspective view of a lead wire for a nonaqueous electrolyte battery according to one embodiment of the present disclosure. FIG. 2 is a partial cross-sectional view of a lead wire for a nonaqueous electrolyte battery according to one embodiment of the present disclosure. As illustrated in FIG. 1 and FIG. 2, a lead wire for a nonaqueous electrolyte battery, 1, has a conductor 3, and an insulating film 5 covering at least a part of the outer peripheral surface of conductor 3. Insulating film 5 has a conductor-covering layer 6 laminated on a surface of conductor 3, a first insulating layer 8 laminated on an outermost surface of insulating film 5, and a second insulating layer 7 laminated on an inner surface of the first insulating layer 8. The conductor corresponds to a lead conductor.

(Conductor)

Conductor 3 is connected to an electrode or the like of a nonaqueous electrolyte battery. The material to be used for conductor 3 is not especially limited as long as being one used as a conductor constituting lead wires for a nonaqueous electrolyte batteries, and examples thereof include metal materials such as aluminum, titanium, nickel, copper, aluminum alloys, titanium alloys, nickel alloys and copper alloys, and these materials plated with nickel, gold or the like. A material for forming conductor 3 to be connected to a positive electrode of a nonaqueous electrolyte battery is preferably one which is not dissolved in discharging, and specifically preferably aluminum, titanium, an aluminum alloy or a titanium alloy. On the other hand, a material for forming conductor 3 to be connected to a negative electrode is preferably nickel, copper, a nickel alloy, a copper alloy, a nickel-plated copper or a gold-plated copper. Further, conductor 3 may be subjected to a surface treatment for preventing corrosion by an electrolyte.

The lower limit of the average thickness of conductor 3 is preferably 0.10 mm. In the case where the average thickness of conductor 3 is 0.10 mm or more, a sufficient quantity of current can be made to flow in practical use as a battery. Then, the lower limit of the average thickness of conductor 3 may further be 0.15 mm, or may also be 0.20 mm. On the other hand, the upper limit of the average thickness of conductor 3 is not especially limited, and can suitably be established, for example, according to a capacity and the like of the nonaqueous electrolyte battery. For example, the upper limit of the average thickness is preferably 5.00 mm. In the case where the average thickness of conductor 3 is 5.00 mm or less, even if quick charging/discharging is carried out, the resistance heat generation at the lead wire site can be suppressed. The upper limit of the average thickness may further be 4 mm. Here, the "average thickness" of conductor 3 is an average value of measurement values of thickness at 10 points. In the below, the "average thickness" has the same meaning.

(Insulating Film)

Insulating film 5 is used as an insulating film for the lead wire for a nonaqueous electrolyte battery. Insulating film 5 has a plurality of layers, and is laminated on an outer peripheral surface of conductor 3 so as to cover at least a part of the outer peripheral surface of conductor 3. The lower limit of the average thickness of insulating film 5 is preferably 0.05 mm. In the case where the average thickness of insulating film 5 is less than 0.05 mm, it becomes difficult for clearances between insulating film 5 and an enclosing container 11 generated by the level difference corresponding to the thickness of conductor 3 to be filled with insulating film 5. The lower limit of the average thickness of insulating film 5 may further be 0.08 mm and may also be 0.10 mm. On the other hand, the upper limit of the average thickness of insulating film 5 is preferably 0.30 mm. In the case where the average thickness of insulating film 5 is more than 0.30 mm, the amount of moisture penetrating from the atmospheric air through insulating film 5 into the inside of a nonaqueous electrolyte battery 10 increases, and the deterioration of nonaqueous electrolyte battery might be hastened. The upper limit of the average thickness of insulating film 5 may further be 0.25 mm, and may also be 0.22 mm. Here, in the present disclosure, the average thickness of insulating film 5 is an average value of measurement values of thicknesses at 10 points on a surface having the largest area out of outer peripheral surfaces of insulating film 5.

In the present embodiment, insulating film 5 has conductor-covering layer 6 laminated on a surface of conductor 3, first insulating layer 8 laminated on an outermost surface of insulating film 5, and second insulating layer 7 laminated on an inner surface of first insulating layer 8.

(Conductor-Covering Layer)

Conductor-covering layer 6 is laminated on a surface of conductor 3. Due to that insulating film 5 has conductor-covering layer 6, the corrosion of conductor 3 can be suppressed.

Conductor-covering layer 6 contains an acid-modified polyolefin. Due to that conductor-covering layer 6 contains an acid-modified polyolefin, the adhesivity with the conductor is good and the adhesivity with second insulating layer 7 can sufficiently be exhibited.

Examples of a polyolefin resin to become an object of acid modification of the acid-modified polyolefin include polyethylene and polypropylene. Among these, polypropylene is preferable.

An acid to be used for the acid modification is not especially limited as long as not impairing the advantageous effect of the present invention, but examples thereof include unsaturated carboxylic acids and derivatives thereof. Examples of the unsaturated carboxylic acids include acrylic acid, methacrylic acid, maleic acid, itaconic acid and fumaric acid. Examples of the derivatives of unsaturated carboxylic acids include maleate monoesters, maleic anhydride, itaconate monoesters, itaconic anhydride, fumarate monoesters and fumaric anhydride. Among these, derivatives of unsaturated carboxylic acids are preferable and maleic anhydride is more preferable, from the viewpoint that the adhesivity (compatibility) of an olefinic resin with a liquid crystal polymer can be further improved.

As the acid-modified polyolefin, an acid-modified polypropylene is preferable, and a maleic anhydride-modified polypropylene is more preferable. Due to that the acid-modified polyolefin is an acid-modified polypropylene, in the case where second insulating layer 7 is constituted of a polypropylene, the adhesivity between conductor-covering layer 6 and second insulating layer 7 is further improved.

The lower limit of the content of the acid-modified polyolefin in conductor-covering layer 6 is preferably 70% by mass. When the content of the acid-modified polyolefin is equal to or lower than the lower limit value, the practically sufficient material characteristic might not be attained. The lower limit of the content of the acid-modified polyolefin in conductor-covering layer 6 may further be 80% by mass or may also be 90% by mass or may also be 100% by mass.

Conductor-covering layer 6 may contain, in the range of not inhibiting the advantageous effect of the present disclosure, thermoplastic resins other than the above acid-modified polyolefin, and may contain other known additives. Examples of the known additives include antioxidants, flame retardants, tackifiers, lubricants, fillers, crystallization accelerators and colorants.

The lower limit of the average thickness T3 of conductor-covering layer 6 is preferably 20 μm. In the case where the average thickness T3 of conductor-covering layer 6 is less than 20 μm, the adhesivity with the conductor might not sufficiently be attained. The lower limit of the average thickness T3 of conductor-covering layer 6 may also be 30 μm, or may also be 40 μm. On the other hand, the upper limit of the average thickness T3 of conductor-covering layer 6 is preferably 150 μm. In the case where the average thickness T3 of conductor-covering layer 6 is more than 150 μm, the amount of moisture penetrating from the atmospheric air through insulating film 5 into the inside of nonaqueous electrolyte battery 10 increases, and the deterioration of the battery might be hastened. The upper limit of the average thickness T3 of conductor-covering layer 6 may also be 120 μm, or may also be 100 μm. Here, in the present disclosure, the average thickness T3 of conductor-covering layer 6 is an average value of measurement values of thicknesses at 10 points on a surface having the largest area out of outer peripheral surfaces of conductor-covering layer 6.

(Second Insulating Layer)

Insulating film 5 has second insulating layer 7 between first insulating layer 8 and conductor-covering layer 6. Second insulating layer 7 is laminated on an inner surface of first insulating layer 8. It is preferable that second insulating layer 7 contains a crosslinked polyolefin or a polyolefin having a higher melting point by 10° C. or more than conductor-covering layer 6. Due to that second insulating layer contains a crosslinked polyolefin or a polyolefin resin having a higher melting point by 10° C. or more than conductor-covering layer 6, when an opening of the enclosing container is heat sealed, second insulating layer is difficult to melt at a heat seal temperature, and the short-circuit between a metal layer of the enclosing container and the conductor can be suppressed.

Polyolefin in the crosslinked polyolefin includes polypropylene, polyethylene and derivatives of these. It is preferable that the crosslinked polyolefin is a crosslinked random polypropylene having a melting point of 130° C. or more and 155° C. or less, and MFR of 3 g/10 min or more and 15 g/10 min or less. Thereby, the adhesivity with conductor-covering layer 6 and first insulating layer 8 is sufficiently exhibited and melting at a heat seal temperature is difficult.

As the high-melting point polyolefin, preferable is a high-melting point polypropylene having a melting point of 155° C. or more, and especially preferable are homo polypropylene, block polypropylene, thermoplastic olefin elastomer (TPO), and the like.

The lower limit of the content of the crosslinked polyolefin in second insulating layer 7 is preferably 70% by mass. When the content of the crosslinked polyolefin is equal to or lower than the lower limit value, the practically sufficient material characteristic might not be attained. The lower limit of the content of the crosslinked polyolefin in second insulating layer 7 may further be 80% by mass, or may also be 90% by mass or may also be 100% by mass.

Second insulating layer 7 may contain, in the range of not inhibiting the advantageous effect of the present disclosure, thermoplastic resins other than the above crosslinked polyolefin, and may contain other known additives. Examples of the known additives include antioxidants, flame retardants, tackifiers, lubricants, fillers, crystallization accelerators and colorants.

The lower limit of the average thickness T2 of second insulating layer 7 is preferably 25 μm. In the case where the average thickness T2 of second insulating layer 7 is less than 25 μm, the strength of second insulating layer 7 might not sufficiently be attained. The lower limit of the average thickness T2 of second insulating layer 7 may further be 30 μm, or may also be 40 μm. On the other hand, the upper limit of the average thickness T2 of second insulating layer 7 is preferably 250 μm. In the case where the average thickness of second insulating layer 7 is more than 250 μm, the amount of moisture penetrating from the atmospheric air through insulating film 5 into the inside of the nonaqueous electrolyte battery increases, resulting in increased amount of moisture penetrating inside, and the deterioration of the battery might be hastened. Here, in the present disclosure, the average thickness T2 of second insulating layer 7 is an average value of measurement values of thicknesses at 10 points on a surface having the largest area out of outer peripheral surfaces of second insulating layer 7.

(First Insulating Layer)

First insulating layer 8 is disposed farthest away from conductor 3, and is formed of a thermoplastic resin. First insulating layer 8 is laminated on an outermost surface of insulating film 5, and is laminated on a surface of the second insulating layer 7. It is preferable that first insulating layer 8 contains, as a main component, a resin to be easily melted at a heat seal temperature when the opening of the enclosing container is heat sealed (thermally fused), and it is more preferable to contain, as a main component, a polyolefin. Here, in the present disclosure, the main component means the component at a content of 50% by mass or more.

The polyolefin includes polypropylene, polyethylene and derivatives of these. It is preferable that the polypropylene is a random polypropylene having a melting point of 120° C. or more and 155° C. or less, and an MFR of 3 g/10 min or more and 15 g/10 min or less. Due to that the polyolefin is a random polyolefin, an advantage is that the adhesivity with second insulating layer 7 and an innermost resin layer of the enclosing container is sufficiently exhibited.

The lower limit of the content of the polyolefin in first insulating layer 8 is preferably 70% by mass. When the content of the polyolefin is equal to or lower than the lower limit value, the practically sufficient material characteristic might not be attained. The lower limit of the content of the polyolefin in first insulating layer 8 may further be 80% by mass, or may also be 90% by mass or may also be 100% by mass.

First insulating layer 8 may contain, in the range of not inhibiting the advantageous effect of the present disclosure, thermoplastic resins other than the above polyolefin. More specifically, first insulating layer 8 may contain a plurality of resins, and the plurality of resins include combinations of homo polypropylene, block polypropylene, random polypropylene, low-crystalline polypropylene, low-density polyethylene, linear low-density polyethylene, low-crystalline ethylene-propylene copolymers, low-crystalline ethylene-butylene copolymers, low-crystalline ethylene-octene copolymers, low-crystalline propylene-ethylene copolymers, and the like.

First insulating layer 8 may contain, in the range of not inhibiting the advantageous effect of the present disclosure, other known additives. Examples of the known additives include antioxidants, flame retardants, tackifiers, lubricants, fillers, crystallization accelerators and colorants.

The lower limit of the average thickness T1 of first insulating layer 8 is preferably 25 μm. In the case where the average thickness T1 of first insulating layer 8 is less than 25 μm, the strength of first insulating layer 8 might not sufficiently be attained. The lower limit of the average thickness T1 of first insulating layer 8 may further be 30 μm, or may also be 40 μm. On the other hand, the upper limit of average thickness T1 of first insulating layer 8 is preferably 250 μm. In the case where the average thickness T1 of first insulating layer 8 is more than 250 μm, the amount of moisture penetrating from the atmospheric air through insulating film 5 into the inside of the nonaqueous electrolyte battery increases, resulting in increased amount of moisture penetrating inside, and the deterioration of the battery might be hastened. Here, in the present disclosure, the average thickness T1 of first insulating layer 8 is an average value of measurement values of thicknesses at 10 points on a surface having the largest area out of outer peripheral surfaces of first insulating layer 8.

The ratio (E1/E2) of an elastic modulus E1 of first insulating layer 8 at any one temperature in the range of 80° C. or more and 125° C. or less to an elastic modulus E2 of second insulating layer 7 at the same temperature as in first insulating layer 8, is 0.10 or more and 10.00 or less and preferably 0.67 or more and 1.5 or less. Due to that the ratio (E1/E2) of an elastic modulus E1 of first insulating layer 8 at any one temperature in the range of 80° C. or more and 125° C. or less to an elastic modulus E2 of second insulating layer 7 at the same temperature as in first insulating layer 8, is 0.10 or more and 10.00 or less, the elastic modulus at any one temperature in the temperature in the range of 80° C. or more and 125° C. or less of first insulating layer 8 and second insulating layer 7 disposed between conductor-covering layer 6 and first insulating layer 8 fall within near ranges. The use upper limit temperature of nonaqueous electrolyte batteries is generally nearly 60° C., but in lead wire for a nonaqueous electrolyte battery, 1, even when a force is generated in the peeling direction on the insulating film under high temperatures higher than the conventional upper limit temperature, since the elastic moduli of the first insulating layer and the second insulating layer laminated on an inner surface of the first insulating layer are near, the two layers are simultaneously deformed by a peel force and the force is dispersed, whereby making the peeling start point can be suppressed. Hence, in the case where lead wire for a nonaqueous electrolyte battery, 1, is accommodated in the enclosing container of the nonaqueous electrolyte battery, and adhered through insulating film 5 with the enclosing container, firm adhesion is easily retained even under high temperatures. Therefore, lead wire for a nonaqueous electrolyte battery, 1, is excellent in the adhesivity under high temperatures with the enclosing container of the nonaqueous electrolyte battery.

The lower limit of the elastic modulus E2 at any one temperature in the range of 80° C. or more and 125° C. or less of second insulating layer 7 may be 10 MPa, or may also be 20 MPa. The upper limit of the elastic modulus E2 may be 900 MPa, or may also be 500 MPa. Due to that the elastic modulus E2 is 10 MPa or more and 900 MPa or less, since the peel strength is improved, and uniformization of the strength of each layer constituting insulating film 5 can be attained and the stress concentration can be suppressed, the cracking and interlayer peeling of insulating film 5 making a joining portion with the enclosing container of the nonaqueous electrolyte battery can be further suppressed.

The lower limit of the elastic modulus E1 at any one temperature in the range of 80° C. or more and 125° C. or less of first insulating layer 8 may be 10 MPa, or may also be 20 MPa. The upper limit of the elastic modulus E1 may be 900 MPa, or may also be 500 MPa. Due to that the elastic modulus E1 is 10 MPa or more and 900 MPa or less, since the peel strength is improved, and uniformization of the strength of each layer constituting insulating film 5 can be attained and the stress concentration can be suppressed, the cracking and interlayer peeling of insulating film 5 making a joining portion with the enclosing container of the nonaqueous electrolyte battery can be further suppressed.

The elastic modulus E2 of second insulating layer 7 at any one temperature in the range of 80° C. or more and 125° C. or less, and the elastic modulus E1 of first insulating layer 8 at the same temperature as in second insulating layer 7 can be regulated, for example, by kneading two or more kinds of resins having different elastic moduli and inorganic fillers. Specifically, for example, by adding a resin whose elastic modulus at 80° C. is as low as about 1 MPa to 20 MPa, like low-crystalline polypropylene, to a resin whose elastic modulus at 80° C. is as high as about 1,200 MPa, like homo polypropylene, in a suitable mass ratio, these layers can be regulated to a target low elastic modulus. Also by adding inorganic fillers such as a flame retardant and a filler in a suitable mass ratio, these layers can be regulated to a target high elastic modulus.

[Method for Manufacturing the Insulating Film]

A method for manufacturing the insulating film of the present disclosure is not especially limited. For example, respective resin compositions for forming the conductor-covering layer, the second insulating layer and the first insulating layer, containing respective resin compositions and additives, are mixed using a well-known mixing apparatus such as an open roll, a pressure kneader, a single-screw mixing machine or a twin-screw mixing machine. Then, in the case of fabricating each insulating layer, a film-shape conductor-covering layer, second insulating layer and first insulating layer can be fabricated by extrusion such as T-die molding or inflation molding. Then, the insulating film is fabricated by superposing the each layer of the conductor-covering layer, the second insulating layer and the first insulating layer and laminating the resultant by thermal lamination. Further in the case of simultaneously fabricating a plurality of layers, an inflation method or a T-die method using co-extrusion can be used. Further, there can also be used an extrusion lamination method which laminates a melted resin on a film formed as a single layer.

The lead wire for a nonaqueous electrolyte battery, due to using the insulating film, is excellent in the adhesivity under high temperatures with the enclosing container of the non-aqueous electrolyte battery.

[Method for manufacturing the lead wire for a nonaqueous electrolyte battery]A method for manufacturing lead wire for a nonaqueous electrolyte battery, 1, is not especially limited, and lead wire for a nonaqueous electrolyte battery, 1, can be manufactured by a known method.

The lead wire for a nonaqueous electrolyte battery is excellent in the adhesivity under high temperatures with the enclosing container of the nonaqueous electrolyte battery.

<Nonaqueous Electrolyte Battery>

Nonaqueous electrolyte battery 10 has the above-mentioned lead wire for a nonaqueous electrolyte battery, 1. Examples of the nonaqueous electrolyte battery include secondary batteries such as lithium ion batteries.

Figure 3:
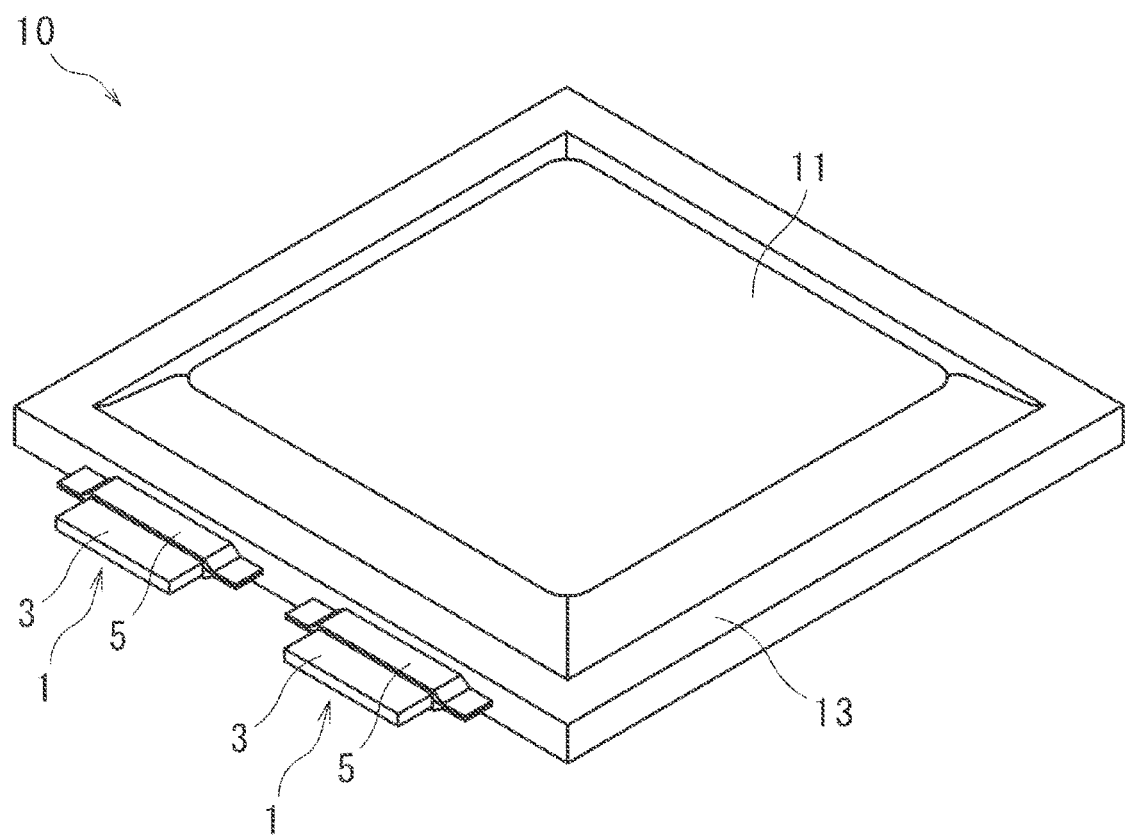
FIG. 3 is a perspective view illustrating one example of a nonaqueous electrolyte battery having lead wires for a nonaqueous electrolyte battery according to one embodiment of the present disclosure.
Figure 4:
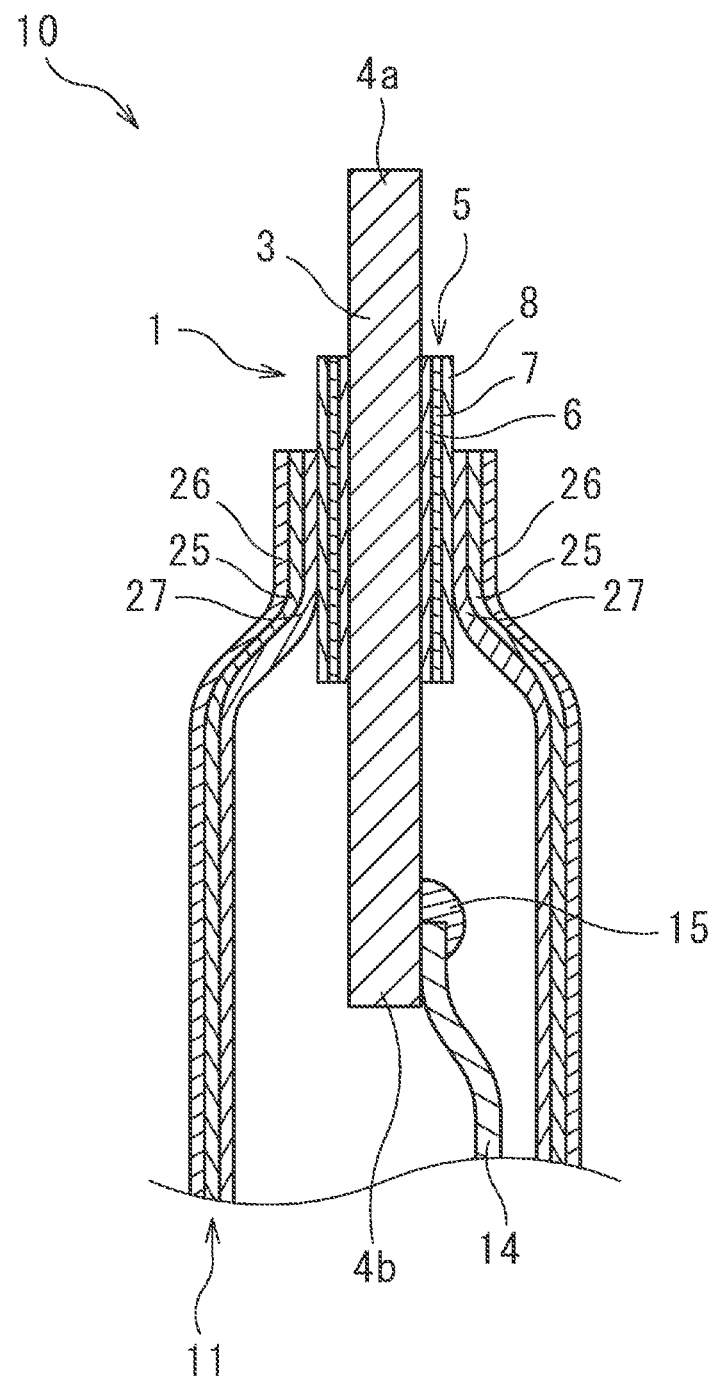
FIG. 4 is a longitudinal cross-sectional view of the nonaqueous electrolyte battery of FIG. 3.

FIG. 3 is a perspective view illustrating one example of a nonaqueous electrolyte battery having the lead wires for a nonaqueous electrolyte battery according to one embodiment of the present disclosure. FIG. 4 is a partial cross-sectional view schematically illustrating one embodiment of the nonaqueous electrolyte battery. Nonaqueous electrolyte battery (secondary battery) 10 illustrated in FIG. 3 and FIG. 4 has a plate positive electrode, a plate negative electrode and a nonaqueous electrolyte (for example, a nonaqueous electrolytic solution), which are not shown in figure, and enclosing container 11 and more than one, specifically two lead wires for a nonaqueous electrolyte battery, 1. The lead wire for a nonaqueous electrolyte battery, 1, is the above-mentioned lead wire for a nonaqueous electrolyte battery. In lead wire for a nonaqueous electrolyte battery, 1, of the present embodiment, as described above, insulating film 5 has conductor-covering layer 6, second insulating layer 7 and first insulating layer 8. Nonaqueous electrolyte battery 10 has a nearly square enclosing container 11 and two lead wires for a nonaqueous electrolyte battery, 1, extending from the inside to the outside of enclosing container 11. Conductor 3 and enclosing container 11 are connected through insulating film 5 in a seal portion 13 of enclosing container 11. Enclosing container 11 is a container accommodating the positive electrode, the negative electrode, a separator and the nonaqueous electrolytic solution in a sealed state.

The positive electrode and the negative electrode not shown in figure are laminated through the separator and form a laminated electrode group. The laminated electrode group and the nonaqueous electrolytic solution are accommodated in a sealed state in enclosing container 11. In enclosing container 11, the laminated electrode group is in a state of being immersed in the electrolytic solution. Enclosing container 11 is, as described later, formed from a sheet body(s). In enclosing container 11, seal portion 13 of the circumference of two sheets of sheet body or one folded sheet of sheet body is thermally fused to thereby make the sealed state.

One end 4a of conductor 3 of one wire in two lead wires for a nonaqueous electrolyte battery, 1, is exposed from enclosing container 11, and the other end 4b thereof is arranged so as to be connected with the positive electrode in enclosing container 11. One end 4a of conductor 3 of the other wire in the two lead wires for a nonaqueous electrolyte battery, 1, is exposed from enclosing container 11, and the other end 4b thereof is arranged so as to be connected with the negative electrode in enclosing container 11.

On both the ends of conductor 3, that is, on the one ends 4a and the other ends 4b, no innermost resin layer (that is, enclosing container 11) is laminated. The one ends 4a of conductors 3 are exposed from enclosing container 11. On the other hand, the other end 4b of conductor 3 of lead wire for a nonaqueous electrolyte battery, 1, of the positive electrode side is connected with a lead wire for internal connection 14 through a solder part 15, and then connected with the positive electrode not shown in figure through lead wire for internal connection 14. Then, similarly, the other end 4b of conductor 3 of lead wire for a nonaqueous electrolyte battery, 1, of the negative electrode side is connected with a lead wire for internal connection 14 through a solder part 15, and then connected with the negative electrode not shown in figure through lead wire for internal connection 14. As illustrated in FIG. 4, middle portions of these lead wires for a nonaqueous electrolyte battery, 1, are each interposed in the sheet body(s) being enclosing container 11 through insulating film 5, and in these portions, innermost resin layer 27 of enclosing container 11 and first insulating layers 8 of the plurality of lead wires for a nonaqueous electrolyte battery, 1 are thermally fused.

The positive electrode and the negative electrode are, typically, laminates in which an active substance layer containing an active substance is laminated on the surface of a current collector such as a metal foil. The shape of the positive electrode and the negative electrode is usually a plate shape, but may be a shape other than the plate shape.

The separator is usually an insulating and porous film. The separator is impregnated with the nonaqueous electrolytic solution.

The nonaqueous electrolytic solution contains a nonaqueous solvent and an electrolyte salt dissolved in the nonaqueous solvent.

Enclosing container 11 is, as illustrated in FIG. 4, constituted of the sheet bodies in which innermost resin layer 27, the metal layer 25 and an outermost resin layer 26 are laminated in this order. Then, in enclosing container 11, two sheets of the sheet body are superposed and there are heat sealed three sides of the sheet body other than one side through which the conductors penetrate, to thereby form a seal portion 13. In the circumference portion of the enclosing container 11, metal layers 25 of the sheet bodies are adhered through innermost resin layers 27. Further in seal portion 13, conductors 3 of lead wires for a nonaqueous electrolyte battery, 1, are adhered with enclosing container 11 through insulating films 5, respectively. In this portion, innermost resin layer 27 of enclosing container 11 and first insulating layers 8 of lead wires for a nonaqueous electrolyte battery, 1 are thermally fused.

Innermost resin layer 27 is laminated directly on the inner surface of metal layer 25. It is preferable that for innermost resin layer 27 positioned in the inner side of enclosing container 11, an insulating resin which is not dissolved in the nonaqueous electrolyte and is melted on being heated is used. As innermost resin layer 27, a polyolefin, an acid-modified polyolefin, or an acid-modified styrene-based elastomer can be used, for example. As innermost resin layer 27, among these, a polypropylene is preferable. The average thickness of innermost resin layer 27 is preferably about 10 µm to 500 µm.

Metal layer 25 has functions of the improvement of the strength of enclosing container 11, the prevention of the penetration of steam, oxygen, light and the like into the battery inside, and the like. Metal layer 25 is formed from a metal such as an aluminum foil. Metal layer 25 has a metal as a main component. Examples of the metal include aluminum, copper, stainless steel and titanium, and aluminum is especially preferable. Metal layer 25 is formed substantially from a metal, but may contain additives and the like other than the metal. Metal layer 25 is of a film shape and it is preferable to be formed of a metal foil, and it is more preferable to be formed of an aluminum alloy foil. The average thickness of metal layer 25 is preferably 10 µm to 50 µm.

Outermost resin layer 26 has a function of protecting the outer surface of metal layer 25, a function of insulation, and the like. Outermost resin layer 26 positioned in the outer side of the enclosing container usually contains a resin as a main component as a material having insulatively. Examples of the resin forming outermost resin layer 26 include polyethylene terephthalate (PET), polyamide, polyester, polyolefin, epoxy resins, acrylic resins, fluororesins, polyurethane, silicon resins, phenol resins, polyetherimide, polyimide, and mixtures and copolymers thereof. The average thickness of outermost resin layer 26 is preferably about 10 µm to 50 µm.

In nonaqueous electrolyte battery 10, as described above, one end of lead wire for a nonaqueous electrolyte battery, 1, that is, one end 4a of conductor 3 is arranged in a state of being exposed from enclosing container 11, and sealed with enclosing container 11. Specifically, lead wire for a nonaqueous electrolyte battery, 1, is arranged so that the innermost resin layer of enclosing container 11 and insulating film 5 of lead wire for a nonaqueous electrolyte battery, 1, are brought into direct contact. In the state that lead wire for a nonaqueous electrolyte battery, 1, is arranged in such a manner, innermost resin layer 27 in seal portion 13 and first insulating layer 8 of lead wire for a nonaqueous electrolyte battery, 1 are thermally fused. Thereby, the positive electrode, the negative electrode and the separator of the laminated electrode group immersed in the nonaqueous electrolytic solution can be sealed in enclosing container 11.

In nonaqueous electrolyte battery 10, the ratio (E4/E1) of an elastic modulus E4 of innermost resin layer 27 at any one temperature in the range of 80° C. or more and 125° C. or less to an elastic modulus E1 of first insulating layer 8 at the same temperature as in innermost resin layer 27 of the enclosing container 11, is 0.10 or more and 10.00 or less, and preferably 0.25 or more and 4.00 or less. By making the ratio, at any one temperature in the range of 80° C. or more and 125° C. or less, of the elastic modulus of innermost resin layer 27 and the first insulating layer thermally fused to be 0.10 or more and 10.00 or less, the elastic modulus at the same temperature in the range of 80° C. or more and 125° C. or less of the first insulating layer and the innermost resin layer thermally fused with the first insulating layer of the enclosing container fall within near ranges. Hence, even if a force is generated in such a direction that the lead wire for a nonaqueous electrolyte battery and the enclosing container are peeled off each other under high temperatures, first insulating layer 8 and innermost resin layer 27 are simultaneously deformed and the force is dispersed, whereby making the peeling start point can be suppressed. Therefore, nonaqueous electrolyte battery 10 is excellent in the adhesivity under high temperatures between lead wire for a nonaqueous electrolyte battery, 1, and enclosing container 11.

The lower limit of the elastic modulus E4 at any one temperature in the range of 80° C. or more and 125° C. or less of innermost resin layer 27 may be 10 MPa or may also be 20 MPa. The upper limit of the elastic modulus E4 may be 900 MPa or may also be 500 MPa. Due to that the elastic modulus E4 at any one temperature in the range of 80° C. or more and 125° C. or less of innermost resin layer 27 is, similarly to the elastic modulus E1 at any one temperature in the range of 80° C. or more and 125° C. or less of the first insulating layer, 10 MPa or more and 900 MPa or less, in nonaqueous electrolyte battery 10, even if a force is generated in such a direction that lead wire for a nonaqueous electrolyte battery, 1, and enclosing container 11 are peeled off each other under high temperatures, first insulating layer 8 and innermost resin layer 27 are simultaneously deformed and the force is dispersed, whereby the effect of suppressing making the peeling start point can be further enhanced.

[Method for manufacturing the nonaqueous electrolyte battery]A method for manufacturing the nonaqueous electrolyte battery according to one embodiment of the present disclosure can suitably be selected from known methods. The method for manufacturing the nonaqueous electrolyte battery includes, for example, preparing the lead wire for a nonaqueous electrolyte battery, preparing the laminated electrode group, preparing the nonaqueous electrolyte, and putting the laminated electrode group connected with the lead wire for a nonaqueous electrolyte battery, and the nonaqueous electrolyte in the enclosing container.

The nonaqueous electrolyte battery of the present embodiment, since having the above-mentioned lead wire for a nonaqueous electrolyte battery, 1, is excellent in the adhesivity between lead wire for a nonaqueous electrolyte battery, 1, and enclosing container 11.

Other Embodiments

It is to be understood that the embodiments herein disclosed are to be taken as examples and not to be restrictive in every respect. The scope of the present disclosure is not limited to the constitutions of the above embodiments, and is defined by the claims and is intended to include any modifications within the meaning and range equivalent to the claims.

In the above embodiments, although the lead wire for a nonaqueous electrolyte battery has the insulating film having a three-layer structure having the conductor-covering layer, the second insulating layer and the first insulating layer, the lead wire for a nonaqueous electrolyte battery may have an insulating film having a multilayer structure having one or more middle layer on the inner side of the second insulating layer.

Examples

Hereinafter, the present invention will be described in more detail by way of Examples, but the present invention is not any more limited to the following Examples.

Materials used are shown below.
[Conductor]
An aluminum plate (average thickness: 0.40 mm)
[Insulating Film]
1. Conductor-Covering Layer
(PP0)
An acid-modified random polypropylene: "Admer QE060" (MFR: 7 g/10 min, melting point: 140° C.), manufactured by Mitsui Chemicals, Inc. 2. Second insulating layer
(PP21)
A block polypropylene: "Novatec BC3AV" (melting point: 165° C., MFR: 10 g/10 min), manufactured by Japan Polypropylene Corporation.
(PP22)
A block polypropylene: a kneaded material of 80 parts by mass of "Novatec BC3AV" (MFR: 10 g/10 min, melting point: 165° C.), manufactured by Japan Polypropylene Corporation, and 20 parts by mass of an ethylene propylene copolymer: "Tafmer P0280" (melting point: 50° C. or less, MFR: 6 g/10 min), manufactured by Mitsui Chemicals, Inc.
(PP23)
A block polypropylene: a kneaded material of 85 parts by mass of "Novatec BC3AV", manufactured by Japan Polypropylene Corporation, and 15 parts by mass of an ethylene propylene copolymer: "Tafmer P0280" (melting point: 50° C. or less, MFR: 6 g/10 min), manufactured by Mitsui Chemicals, Inc.
(PP24)
A block polypropylene: a kneaded material of 60 parts by mass of "Novatec BC3AV", manufactured by Japan Polypropylene Corporation, and 40 parts by mass of an ethylene propylene copolymer: "Tafmer P0280" (melting point: 50° C. or less, MFR: 6 g/10 min), manufactured by Mitsui Chemicals, Inc.
(PP25)
A block polypropylene: a kneaded material of 90 parts by mass of "Novatec BC3AV", manufactured by Japan Polypropylene Corporation, and 10 parts by mass of an ethylene propylene copolymer: "Tafmer P0280" (melting point: 50° C. or less, MFR: 6 g/10 min), manufactured by Mitsui Chemicals, Inc.
(PP26)
A homo polypropylene: "Homo MA3H" (MFR: 10 g/10 min, melting point: 165° C.), manufactured by Japan Polypropylene Corporation.
(PP27)
A homo polypropylene: a kneaded material of 100 parts by mass of "Homo MA3H", manufactured by Japan Polypropylene Corporation, and 5 parts by mass of Simgon Talc (average particle diameter: 8 μm, specific surface area: 13 m$^2$/g), manufactured by NIPPON TALC CO., LTD.
(PP28)
A block polypropylene: a kneaded material of 40 parts by mass of "Novatec BC3AV", manufactured by Japan Polypropylene Corporation, and 60 parts by mass of an ethylene propylene copolymer: "Tafmer P0280" (melting point: 50° C. or less, MFR: 6 g/10 min), manufactured by Mitsui Chemicals, Inc.
3. First Insulating Layer
(PP11)
A random polypropylene: a kneaded material of 70 parts by mass of "Prime Polypro F227D", manufactured by Prime Polymer Co., Ltd., and 30 parts by mass of an ethylene propylene copolymer: "Tafmer P0280" (melting point: 50° C. or less, MFR: 6 g/10 min), manufactured by Mitsui Chemicals, Inc.
(PP12)
A random polypropylene: a kneaded material of 80 parts by mass of "Prime Polypro F227D", manufactured by Prime Polymer Co., Ltd., and 20 parts by mass of an ethylene propylene copolymer: "Tafmer P0280" (melting point: 50° C. or less, MFR: 6 g/10 min), manufactured by Mitsui Chemicals, Inc.
(PP13)
A random polypropylene: a kneaded material of 60 parts by mass of "Prime Polypro F227D", manufactured by Prime Polymer Co., Ltd., and 40 parts by mass of an ethylene propylene copolymer: "Tafmer P0280" (melting point: 50° C. or less, MFR: 6 g/10 min), manufactured by Mitsui Chemicals, Inc.
(PP14)
A random polypropylene: a kneaded material of 90 parts by mass of "Prime Polypro F227D", manufactured by Prime Polymer Co., Ltd., and 10 parts by mass of an ethylene propylene copolymer: "Tafmer P0280" (melting point: 50° C. or less, MFR: 6 g/10 min), manufactured by Mitsui Chemicals, Inc.
(PP15)
A random polypropylene: "Prime Polypro F227D" (MFR: 7 g/10 min, melting point: 140° C.), manufactured by Prime Polymer Co., Ltd.
(PP16)
A random polypropylene: "SunAllomer PF621S" (MFR: 6 g/10 min, melting point: 150° C.), manufactured by SunAllomer Ltd.
(PP17)
A random polypropylene: a kneaded material of 100 parts by mass of "SunAllomer PF621S", manufactured by SunAllomer Ltd., and 5 parts by mass of Simgon Talc (average particle diameter: 8 μm, specific surface area: 13 m$^2$/g), manufactured by NIPPON TALC CO., LTD.
(PP18)
A soft polypropylene resin: "Welnex RFX4V" (melting point: 140° C., MFR: 6 g/10 min), manufactured by Japan Polypropylene Corporation.
[Enclosing Container]
An aluminum package material "EL408PH(3)", manufactured by Dai Nippon Printing Co., Ltd., having the following composition was used.
1. Innermost Resin Layer
(PP4)
An acid-modified random polypropylene: "Admer QE060" (MFR: 7 g/10 min, melting point: 140° C.), manufactured by Mitsui Chemicals, Inc.
2. Metal Layer
An aluminum layer (average thickness: 40 μm)
3. Outermost Resin Layer
An aliphatic polyamide (nylon 6,6: registered trademark)
[Test No. 1]
(Fabrication of an Insulating Film)
As materials of resin compositions of a conductor-covering layer, a second insulating layer and a first insulating layer, resins described in Table 1 to Table 3 were used, and the respective resin compositions of the conductor-covering layer, the second insulating layer and the first insulating layer each having a composition described in Table 1 to Table 3 were fabricated by a mixing apparatus. By using a coat hanger-type three-kind three-layer T-die film forming machine equipped with three single-screw extruding machines, the resin composition for the conductor-covering layer, the resin composition for the second insulating layer and the resin composition for the first insulating layer were charged in the first extruding machine, the second extruding machine and the third extruding machine, respectively, and were co-extruded to thereby obtain a three-layer insulating film having the conductor-covering layer resin composition/the second insulating layer resin composition/the first insulating layer resin composition laminated in this order. At this time, the average thickness of the layers was 50 μm for the conductor-covering layer, 50 μm for the second insulating layer, and 50 μm for the first insulating layer.

(Fabrication of a Lead Wire for a Nonaqueous Electrolyte Battery)

Then, the three-layer insulating film obtained was cut into a predetermined size and subjected to heat sealing on both surfaces of the conductor under the condition of a metal mold temperature of 220° C. and a surface pressure of 0.3 MPa. Thus, a No. 1 lead wire for a nonaqueous electrolyte battery was obtained.

(Fabrication of an Enclosing Container)

On one surface of an aluminum foil of 40 μm in thickness, two 15 μm-thick aliphatic polyamide-made sheets were laminated by dry lamination, and on the other surface thereof, a 80 μm-thick PP4 resin sheet was laminated by heat lamination, to thereby obtain a laminate film. By using the obtained laminate film so that the aliphatic polyamide-made resin sheet is an outermost resin layer, an enclosing container with the circumference thereof sealed so that one side is an opening was fabricated.

(Fabrication of a Nonaqueous Electrolyte Battery)

By using the lead wire and the enclosing container obtained as described above, a seal portion through which the lead wire was made to penetrate was thermally fused under the condition of 200° C., a surface pressure of 2.0 MPa and 3 s to thereby fabricate a nonaqueous electrolyte battery.

[No. 2 to No. 29]

Respective nonaqueous electrolyte batteries were obtained as in No. 1, except for preparing respective resin compositions of a conductor-covering layer, a second insulating layer and a first insulating layer, and average thicknesses of respective insulating layers, as indicated in Table 1 to Table 3.

[Evaluations]

(Measurement of the Elastic Modulus)

For the second insulating layer and the first insulating layer of each of the lead wires for a nonaqueous electrolyte battery of No. 2 to No. 4, No. 6 to No. 23, No. 25 and No. 27 to No. 29 obtained, and the innermost resin layer of the enclosing container obtained, the elastic modulus in the temperature range of 80° C. or more and 125° C. or less was measured by the above-mentioned method using the nano indentor. The results are shown in Table 1 to Table 3.

Then, for No. 1, No. 5, No. 24 and No. 26, the elastic modulus at 60° C. was measured as Reference Example by the above-mentioned method.

(Peel Strength)

The peel strength between the insulating film and the laminate film being the enclosing container was measured by the following procedure.

"TGI-2 kN", manufactured by MinebeaMitsumi Inc., as a tensile testing machine, a 1 kN-capacity load cell as a load cell, and a thermostatic chamber (optional) "THB-B" as a high-temperature environment were used, and after 3 min had elapsed since the chamber became thermally stable at a target temperature after a sample was charged in the chamber, the peel test was carried out. The interchuck distance was set at 20 mm; by using metal-made flat plate chuck jigs with file cuts, a conductor plate portion was held in a lower-side chuck and an aluminum packaging material portion was held in an upper-side chuck; and the peel test was carried out so the peel mode as to become 180° peel at a peel rate of 50 mm/min by moving the upper-side chuck, to measure the peel strength [N/cm]. Here, the values [N/cm] of peel strength in the 180° peel test described in Table 1 to Table 3 were each determined as a value obtained by dividing the maximum test force acquired in the test by a width of a test piece.

The 180° peel test was carried out under the condition of a measurement temperature in the range of 80° C. or more and 125° C. or less indicated in Table 1 to Table 3, and a peel rate of 50 mm/min, and the peel strength was recorded. The results are shown in Table 1 to Table 3.

(Overall Judgment of the Peel Test Results)

Overall judgment was made based on the above measured peel strength results of 80° C. or more and 125° C. or less. The overall judgment was made by evaluation in three ranks of A, B and C. The evaluation criteria of the overall judgment were as follows. The case where the evaluation was A or B was judged as accepted.

A: 60 or more
B: 40 or more and less than 60
C: less than 40

TABLE 1

| | | | | No. 1 | No. 2 | No. 3 | No. 4 | No. 5 | No. 6 | No. 7 | No. 8 |
|---|---|---|---|---|---|---|---|---|---|---|---|
| Lead wire for a nonaqueous electrolyte battery | Conductor | | Material | Al | Al | Al | Al | Al | Al | Al | Al |
| | | | Average thickness [mm] | 0.40 | 0.40 | 0.40 | 0.40 | 0.40 | 0.40 | 0.40 | 0.40 |
| | Insulating film | First insulating layer | Material | PP11 | PP11 | PP11 | PP11 | PP12 | PP12 | PP12 | PP12 |
| | | | Average thickness T1 [μm] | 50 | 50 | 50 | 50 | 50 | 50 | 50 | 50 |
| | | | Measurement temperature [° C.] | 60 | 80 | 100 | 120 | 60 | 80 | 100 | 120 |
| | | | Elastic modulus E1 [MPa] | 160 | 110 | 70 | 45 | 290 | 170 | 90 | 50 |
| | | Second insulating layer | Material | PP21 | PP21 | PP21 | PP21 | PP22 | PP22 | PP22 | PP22 |
| | | | Average thickness T2 [μm] | 50 | 50 | 50 | 50 | 50 | 50 | 50 | 50 |

TABLE 1-continued

|  |  |  | No. 1 | No. 2 | No. 3 | No. 4 | No. 5 | No. 6 | No. 7 | No. 8 |
|---|---|---|---|---|---|---|---|---|---|---|
|  |  | Measurement temperature [° C.] | 60 | 80 | 100 | 120 | 60 | 80 | 100 | 120 |
|  |  | Elastic modulus $E_2$ [MPa] | 1150 | 840 | 620 | 420 | 480 | 360 | 270 | 190 |
|  | Conductor-covering layer | Material | PP0 | PP0 | PP0 | PP0 | PP0 | PP0 | PP0 | PP0 |
|  |  | Average thickness $T_3$ [μm] | 50 | 50 | 50 | 50 | 50 | 50 | 50 | 50 |
|  |  | Average total thickness [μm] | 150 | 150 | 150 | 150 | 150 | 150 | 150 | 150 |
|  |  | $E_1/E_2$ | 0.14 | 0.13 | 0.11 | 0.11 | 0.60 | 0.47 | 0.33 | 0.26 |
| Enclosing container | Innermost resin layer | Material | PP4 | PP4 | PP4 | PP4 | PP4 | PP4 | PP4 | PP4 |
|  |  | Average thickness [μm] | 80 | 80 | 80 | 80 | 80 | 80 | 80 | 80 |
|  |  | Measurement temperature [° C.] | 60 | 80 | 100 | 120 | 60 | 80 | 100 | 120 |
|  |  | Elastic modulus $E_4$ [MPa] | 380 | 210 | 100 | 30 | 380 | 210 | 100 | 30 |
|  | Metal layer | Material | Al | Al | Al | Al | Al | Al | Al | Al |
|  |  | Average thickness [μm] | 40 | 40 | 40 | 40 | 40 | 40 | 40 | 40 |
|  | Outermost resin layer | Material | polyamide | polyamide | polyamide | polyamide | polyamide | polyamide | polyamide | polyamide |
|  |  | Average thickness [μm] | 33 | 33 | 33 | 33 | 33 | 33 | 33 | 33 |
|  |  | $E_4/E_1$ | 2.38 | 1.91 | 1.43 | 0.67 | 1.31 | 1.24 | 1.11 | 0.60 |
| Evaluation | Peel test between enclosing container and insulating film | Measurement temperature [° C.] | 60 | 80 | 100 | 120 | 60 | 80 | 100 | 120 |
|  |  | Peel strength [N/cm] | 59 | 52 | 54 | 46 | 65 | 62 | 63 | 61 |
|  |  | Judgment | B | B | B | B | A | A | A | A |

TABLE 2

| | | | | No. 9 | No. 10 | No. 11 | No. 12 | No. 13 | No. 14 | No. 15 | No. 16 | No. 17 | No. 18 | No. 19 | No. 20 | No. 21 | No. 22 | No. 23 |
|---|---|---|---|---|---|---|---|---|---|---|---|---|---|---|---|---|---|---|
| Lead wire for a nonaqueous electrolyte battery | Conductor | | Material | Al | Al | Al | Al | Al | Al | Al | Al | Al | Al | Al | Al | Al | Al | Al |
| | | | Average thickness [mm] | 0.40 | 0.40 | 0.40 | 0.40 | 0.40 | 0.40 | 0.44 | 0.40 | 0.40 | 0.40 | 0.40 | 0.40 | 0.40 | 0.40 | 0.40 |
| | Insulating film | First insulating layer | Material | PP13 | PP13 | PP11 | PP14 | PP15 | PP16 | PP12 | PP12 | PP12 | PP12 | PP12 | PP12 | PP12 | PP12 | PP12 |
| | | | Average thickness T1 [μm] | 50 | 50 | 50 | 50 | 50 | 50 | 50 | 50 | 50 | 50 | 20 | 30 | 70 | 50 | 60 |
| | | | Measurement temperature [° C.] | 90 | 90 | 90 | 90 | 90 | 90 | 90 | 90 | 90 | 90 | 90 | 90 | 90 | 90 | 90 |
| | | | Elastic modulus E1 [MPa] | 85 | 60 | 90 | 220 | 330 | 360 | 140 | 140 | 140 | 140 | 140 | 140 | 140 | 140 | 140 |
| | | Second insulating layer | Material | PP23 | PP23 | PP23 | PP23 | PP23 | PP23 | PP23 | PP24 | PP25 | PP21 | PP22 | PP22 | PP22 | PP22 | PP22 |
| | | | Average thickness T2 [μm] | 50 | 50 | 50 | 50 | 50 | 50 | 50 | 50 | 50 | 50 | 50 | 50 | 30 | 20 | 70 |
| | | | Measurement temperature [° C.] | 90 | 90 | 90 | 90 | 90 | 90 | 90 | 90 | 90 | 90 | 90 | 90 | 90 | 90 | 90 |
| | | | Elastic modulus E2 [MPa] | 330 | 330 | 330 | 330 | 330 | 330 | 180 | 260 | 550 | 750 | 330 | 330 | 330 | 330 | 330 |
| | | Conductor-covering layer | Material | PP0 | PP0 | PP0 | PP0 | PP0 | PP0 | PP0 | PP0 | PP0 | PP0 | PP0 | PP0 | PP0 | PP0 | PP0 |
| | | | Average thickness T3 [μm] | 50 | 50 | 50 | 50 | 50 | 50 | 50 | 50 | 50 | 50 | 80 | 70 | 50 | 80 | 70 |
| | | Average total thickness [μm] | | 150 | 150 | 150 | 150 | 150 | 150 | 150 | 150 | 150 | 150 | 150 | 150 | 150 | 150 | 200 |
| | | E1/E2 | | 0.26 | 0.18 | 0.27 | 0.67 | 1.00 | 1.09 | 0.78 | 0.54 | 0.25 | 0.19 | 0.42 | 0.42 | 0.42 | 0.42 | 0.42 |
| Enclosing container | Innermost resin layer | | Material | PP4 | PP4 | PP4 | PP4 | PP4 | PP4 | PP4 | PP4 | PP4 | PP4 | PP4 | PP4 | PP4 | PP4 | PP4 |
| | | | Average thickness [μm] | 80 | 80 | 80 | 80 | 80 | 80 | 80 | 80 | 80 | 80 | 80 | 80 | 80 | 80 | 80 |
| | | | Measurement temperature [° C.] | 90 | 90 | 90 | 90 | 90 | 90 | 90 | 90 | 90 | 90 | 90 | 90 | 90 | 90 | 90 |
| | | | Elastic modulus E4 [MPa] | 150 | 150 | 150 | 150 | 150 | 150 | 150 | 150 | 150 | 150 | 150 | 150 | 150 | 150 | 150 |
| | Metal layer | | Material | Al | Al | Al | Al | Al | Al | Al | Al | Al | Al | Al | Al | Al | Al | Al |
| | | | Average thickness [μm] | 40 | 40 | 40 | 40 | 40 | 40 | 40 | 40 | 40 | 40 | 40 | 40 | 40 | 40 | 40 |
| | Outermost resin layer | | Material | poly-amide | poly-amide | poly-amide | poly-amide | poly-amide | poly-amide | poly-amide | poly-amide | poly-amide | poly-amide | poly-amide | poly-amide | poly-amide | poly-amide | poly-amide |
| | | | Average thickness [μm] | 33 | 33 | 33 | 33 | 33 | 33 | 33 | 33 | 33 | 33 | 33 | 33 | 33 | 33 | 33 |
| | E4/E1 | | | 1.76 | 2.50 | 1.67 | 0.68 | 0.45 | 0.42 | 1.07 | 1.07 | 1.07 | 1.07 | 1.07 | 1.07 | 1.07 | 1.07 | 1.07 |
| Evaluation | Peel test between enclosing container and insulating film | | Measurement temperature [° C.] | 90 | 90 | 90 | 90 | 90 | 90 | 90 | 90 | 90 | 90 | 90 | 90 | 90 | 90 | 90 |
| | | | Peel strength [N/cm] | 66 | 46 | 65 | 67 | 53 | 52 | 59 | 64 | 67 | 58 | 60 | 63 | 64 | 61 | 66 |
| | | | Judgment | A | B | A | A | A | A | A | A | A | B | A | A | A | A | A |

TABLE 3

| | | | | No. 24 | No. 25 | No. 26 | No. 27 | No. 28 | No. 29 |
|---|---|---|---|---|---|---|---|---|---|
| Lead wire for a nonaqueous electrolyte battery | Conductor | | Material | Al | Al | Al | Al | Al | Al |
| | | | Average thickness [mm] | 0.40 | 0.40 | 0.40 | 0.40 | 0.40 | 0.40 |
| | Insulating film | First insulating layer | Material | PP18 | PP18 | PP17 | PP17 | PP17 | PP16 |
| | | | Average thickness T1 [μm] | 50 | 50 | 50 | 50 | 50 | 50 |
| | | | Measurement temperature [° C.] | 60 | 100 | 60 | 80 | 120 | 80 |
| | | | Elastic modulus E1 [MPa] | 120 | 35 | 200 | 100 | 30 | 450 |
| | | Second insulating layer | Material | PP26 | PP26 | PP27 | PP27 | PP27 | PP28 |
| | | | Average thickness T2 [μM] | 50 | 50 | 50 | 50 | 50 | 50 |
| | | | Measurement temperature [° C.] | 60 | 100 | 60 | 80 | 120 | 80 |
| | | | Elastic modulus E2 [MPa] | 1600 | 900 | 2000 | 1600 | 1200 | 40 |
| | | Conductor-covering layer | Material | PP0 | PP0 | PP0 | PP0 | PP0 | PP0 |
| | | | Average thickness T3 [μm] | 50 | 50 | 50 | 50 | 50 | 50 |
| | | | Average total thickness [μm] | 150 | 150 | 150 | 150 | 150 | 150 |
| | | | E1/E2 | 0.08 | 0.04 | 0.10 | 0.06 | 0.03 | 11.25 |
| Enclosing container | Innermost resin layer | | Material | PP4 | PP4 | PP4 | PP4 | PP4 | PP4 |
| | | | Average thickness [μm] | 80 | 80 | 80 | 80 | 80 | 80 |
| | | | Measurement temperature [° C.] | 60 | 100 | 60 | 80 | 120 | 80 |
| | | | Elastic modulus E4 [MPa] | 380 | 100 | 210 | 210 | 30 | 210 |
| | Metal layer | | Material | Al | Al | Al | Al | Al | Al |
| | | | Average thickness [μm] | 40 | 40 | 40 | 40 | 40 | 40 |
| | Outermost resin layer | | Material | polyamide | polyamide | polyamide | polyamide | polyamide | polyamide |
| | | | Average thickness [μm] | 33 | 33 | 33 | 33 | 33 | 33 |
| | | | E4/E1 | 3.17 | 2.86 | 1.05 | 2.10 | 1.00 | 0.47 |
| Evaluation | Peel test between enclosing container and insulating film | | Measurement temperature [° C.] | 60 | 100 | 60 | 80 | 120 | 80 |
| | | | Peel strength [N/cm] | 43 | 28 | 41 | 38 | 35 | 31 |
| | | | Judgment | C | C | B | C | C | C |

As indicated in Table 1 to Table 3, in No. 2 to No. 4 and No. 6 to No. 23, in which the conductor-covering layer of the insulating film contained the acid-modified polyolefin, and the ratio (E1/E2), of the elastic modulus E1 of the first insulating layer at any one temperature in the range of 80° C. or more and 125° C. or less to the elastic modulus E2 of the second insulating layer at the same temperature as in the first insulating layer, is 0.10 or more and 10.00 or less, the peel strength at a temperature of 80° C. or more and 125° C. or less was good. In particular, in No. 6 to No. 9, No. 11 to No. 17 and No. 19 to No. 23, in which the ratio (E1/E2), of the elastic modulus E1 at any one temperature in the range of 80° C. or more and 125° C. or less of the first insulating layer to the elastic modulus E2 of the second insulating layer at the same temperature as in the first insulating layer, was 0.25 or more and 4.00 or less, the peel strength at a temperature in the range of 80° C. or more and 125° C. or less was especially excellent.

By contrast, in the lead wires for a nonaqueous electrolyte battery of No. 25 and No. 27 to No. 29, in which the ratio (E1/E2) of the elastic modulus E1 was less than 0.25 or more than 4.00, the peel strength at a temperature in the range of 80° C. or more and 125° C. or less exhibited a low value. Although the peel strength at 60° C. of No. 26 was good, in the case of the evaluation at 80° C. or 120° C. of No. 27 and No. 28, which had the insulating film and the enclosing container having the same compositions, the ratio (E1/E2) of the elastic modulus E1 lowered and the peel strength also lowered.

The above results proved that the lead wire for a nonaqueous electrolyte battery was excellent in the adhesivity under high temperatures between the lead wire and the enclosing container of the nonaqueous electrolyte battery.

REFERENCE SIGNS LIST

1 LEAD WIRE FOR A NONAQUEOUS ELECTROLYTE BATTERY
3 CONDUCTOR
4a ONE END
4b OTHER END
5 INSULATING FILM
6 CONDUCTOR-COVERING LAYER
7 SECOND INSULATING LAYER
8 FIRST INSULATING LAYER
10 NONAQUEOUS ELECTROLYTE BATTERY
11 ENCLOSING CONTAINER
13 SEAL PORTION
14 LEAD WIRE FOR INTERNAL CONNECTION
15 SOLDER PART
25 METAL LAYER

26 OUTERMOST RESIN LAYER
27 INNERMOST RESIN LAYER

The invention claimed is:

1. A nonaqueous electrolyte battery, comprising:
an enclosing container; and
a plurality of lead wires for a nonaqueous electrolyte battery arranged so as to extend from the inside of the enclosing container to the outside thereof,
wherein the enclosing container comprises a sheet body having an innermost resin layer, a metal layer and an outermost resin layer laminated in this order;
the lead wires for the nonaqueous electrolyte battery, comprises:
 a conductor; and
 an insulating film having a plurality of layers and covering at least a part of an outer peripheral surface of the conductor,
wherein the insulating film has a conductor-covering layer laminated on a surface of the conductor, a first insulating layer laminated on an outermost surface of laminated on an outermost surface of the insulating film, and a second insulating layer laminated on an inner surface of the first insulating layer,
the conductor-covering layer comprises an acid-modified polyolefin,
a ratio (E1/E2) of an elastic modulus E1 of the first insulating layer at any one temperature in the range of 80° C. or more and 125° C. or less to an elastic modulus E2 of the second insulating layer at the same temperature as in the first insulating layer, is 0.25 or more and 0.67 or less,
the innermost resin layer and the first insulating layer are thermally fused, and
a ratio (E4/E1) of an elastic modulus E4 of the innermost resin layer at any one temperature in the range of 80° C. or more and 125° C. or less to the elastic modulus E1 of the first insulating layer at the same temperature as in the innermost resin layer, is 0.60 or more and 1.76 or less.

2. The nonaqueous electrolyte battery according to claim 1,
wherein the elastic modulus E2 is 10 MPa or more and 900 MPa or less; and
the elastic modulus E1 is 10 MPa or more and 900 MPa or less.

3. The nonaqueous electrolyte battery according to claim 1,
wherein the elastic modulus E2 is 20 MPa or more and 500 MPa or less; and
the elastic modulus E1 is 20 MPa or more and 500 MPa or less.

4. The nonaqueous electrolyte battery according to claim 1,
wherein an average thickness T2 of the second insulating layer is 25 mm or more; and
an average thickness T1 of the first insulating layer is 25 mm or more.

5. The nonaqueous electrolyte battery according to claim 1, wherein the elastic modulus E4 is 10 MPa or more and 900 MPa or less.

\* \* \* \* \*